Nov. 8, 1966  J. R. COFFING  3,283,584
ADJUSTABLE PRESSURE ADAPTOR AND SENSING DEVICE
Filed Oct. 28, 1963  3 Sheets-Sheet 1

Inventor
James R. Coffing
Dominik, Rudy & Stein
Attorneys

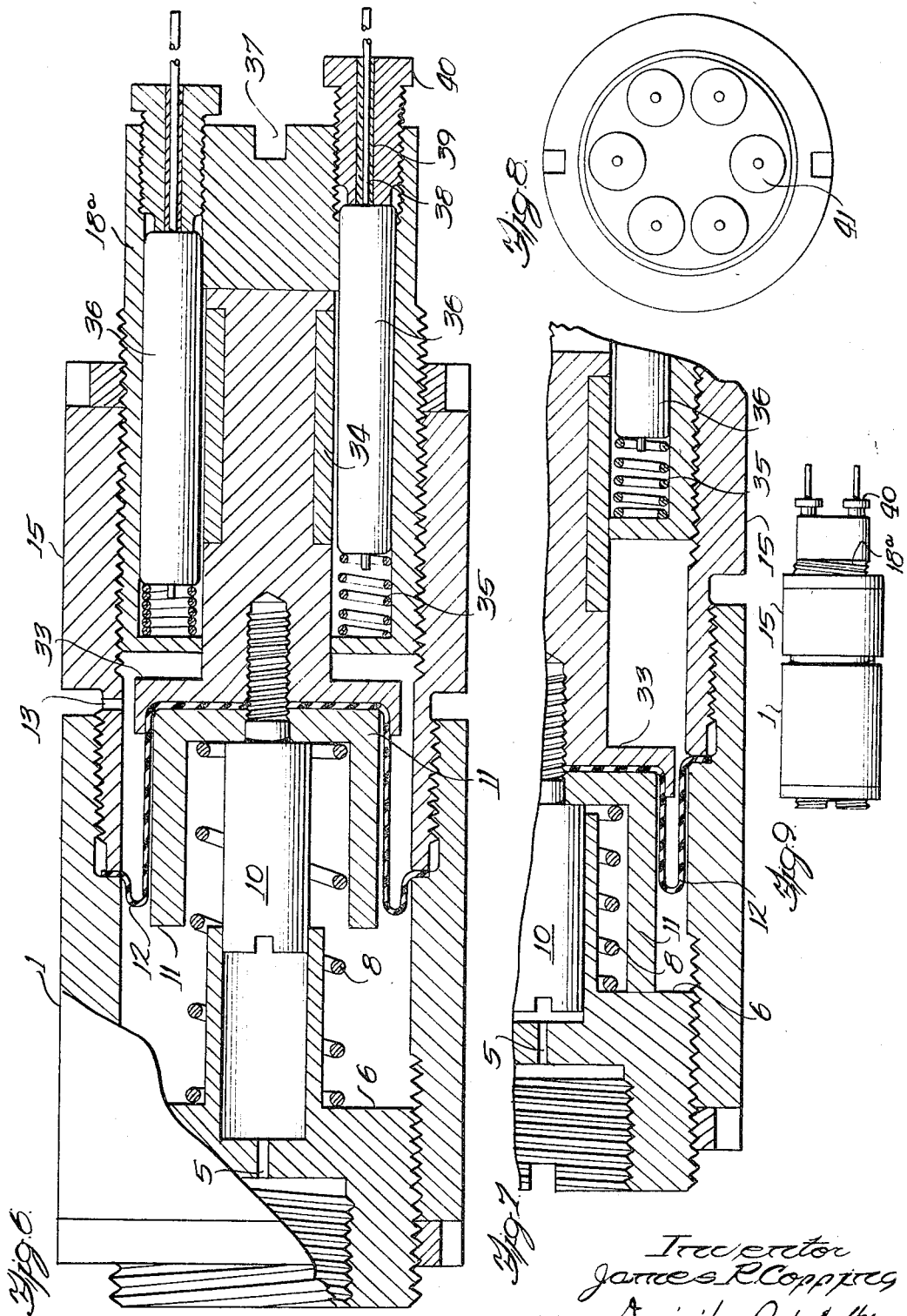

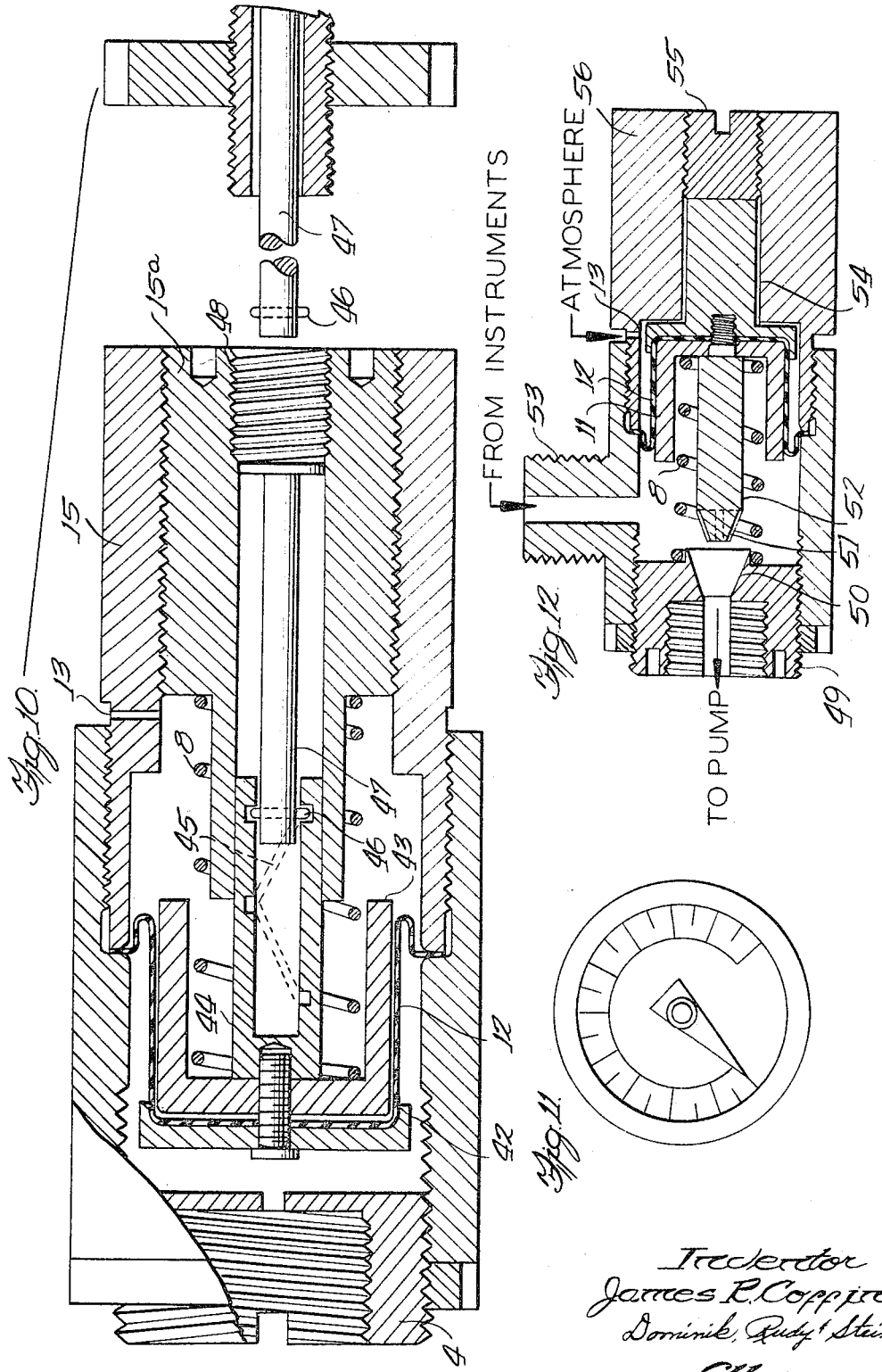

United States Patent Office 3,283,584
Patented Nov. 8, 1966

3,283,584
ADJUSTABLE PRESSURE ADAPTOR AND SENSING DEVICE
James R. Coffing, R.R. 2, Box 224, Covington, Ind.
Filed Oct. 28, 1963, Ser. No. 319,137
6 Claims. (Cl. 73—419)

The present invention relates to an adjustable pressure sensing device, and more particularly to a construction adaptable to be used as a vacuum gauge, pressure gauge, or vacuum regulator with minor modification. The device relies for its intelligence on the reciprocating movement of a piston within a confined chamber which is divided into two sections by a flexible membrane. While there are a wide variety of applications, the adjustable pressure sensing device, such as will be disclosed in detail, has extensive utility and application in the aircraft instrumentation field.

Heretofore, vacuum or suction gauges have been of the aneroid type. By aneroid, reference is made to a metal bellows of wafer-like construction which expands or contracts over its short width in response to pressure changes. Unfortunately, temperature changes will similarly affect, to a limited degree, such expansion and contraction. The slight movements of the metal bellows is then translated by means of a complex gear arrangement to a rotary motion on the dial, calibrated to read the pressure variations. Such constructions are inherently complex, and they have as many as seventy-five to one hundred separate and moving parts for use on a typical aircraft instrument installation.

The present invention, because it relies on a single longitudinally reciprocatingly moving piston in combination with a flexible diaphragm, has inherently fewer parts, some fifteen to twenty in number, and accordingly, is less expensive to be manufactured, maintained and installed.

In view of the foregoing, it is apparent that the principal object of the present invention is to provide an adjustable pressure sensing device which, because of its greatly simplified construction, is inherently less expensive than the devices of the character now known, and yet is susceptible of calibration to the same or better accuracies than have been known in the past.

An additional object of the present invention is to provide an adjustable pressure sensing device, the construction of which is adaptable to a wide variety of applications, such as vacuum regulation, pressure indications, as well as vacuum readings.

Still another object of the present invention is to provide an adjustable pressure sensing device with a flexible diaphragm which substantially relaxes the tolerance requirements for all parts and thereby further reduces the cost, and inherently improves the useful life.

Still another object of the present invention is to provide an adjustable pressure sensing device, the adjustment and calibration of which is readily accomplished without special tooling, and accordingly, can be adjusted in the field without removal of the installation to special cost and calibration equipment.

Still another and important object of the invention is to provide an adjustable pressure sensing device which is adaptable to a wide variety of pressure ranges, and accordingly, the tooling for one such unit is susceptible of utilization in several different products.

Still another object of the invention is to provide an adjustable pressure sensing device, the repair and rebuilding of which is greatly simplified over prior art devices, and which therefore will be less expensive to maintain over its estimated useful life.

Still another significant object of the present invention is to provide an adjustable pressure sensing device which is susceptible of miniaturized tubular construction, and accordingly, requires inherently less space for mounting and orientation in an aircraft instrument panel where space for mounting is at a premium, and some tolerances between instruments are critical.

A related object is to provide a vacuum gauge which can be directly attached to one of the principal vacuum driven instruments, and thereby give a more direct and critical reading of the vacuum supply to the instrument as well as permit the viewing of the vacuum gauge adjacent to the instrument without requiring a separate hole in the instrument panel on the aircraft.

Still another object of the invenion is to provide an adjustable pressure sensing device which is adaptable to fluids as well as gases.

Another significant object of the present invention is to provide an adjustable pressure sensing device which not only can read out directly in a dial presentation, but is susceptible to calibration to either digital light reading, or the activation of relays which will automatically respond to various pressures sensed by the instrument.

Yet another objective in saving both space and plumbing is achieved by providing an adjustable pressure sensing device which is small enough to be built into its host instrument.

Further objects and advantages of the present invention will become apparent as illustrative embodiments are described and disclosed herein, taken in conjunction with the accompanying drawings in which:

FIG. 6 is an enlarged view of an alternative embodiment of the sectioned vacuum gauge shown in FIGS. 3 and 4 illustrating an electrical sensing device coupled with the unit in order to respond to varying readings with electrical impulses.

FIG. 7 is an enlarged view of the alternative embodiment shown in FIG. 6 showing the lower portion thereof, and illustrating the piston in a position opposed from that illustrated in FIG. 6.

FIG. 8 is an end view of the alternative embodiment shown in FIG. 6 illustrating how the electrical contacters are positioned radially around the instrument.

FIG. 9 is a front elevation of the exterior configuration of the alternative embodiment disclosed in FIGS. 6 through 8 inclusive.

FIG. 10 is a longitudinal enlarged section partially in exploded view of a third alternative embodiment which has been adapted for pressure readings as opposed to vacuum readings.

FIG. 11 is an end view showing the dial not shown in FIG. 10.

FIG. 12 is a longitudinal sectional view of a fourth alternative embodiment illustrating how the invention may be employed in a vacuum regulator.

Figure 1:
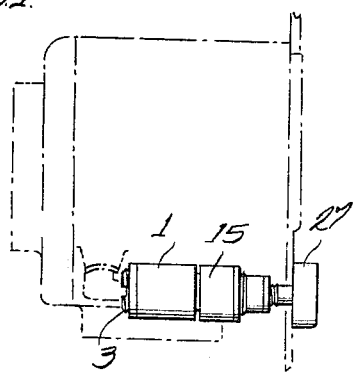
FIG. 1 is a front elevation of a vacuum gauge illustrative of the present invention in which the directional gyro to which it has been mounted is shown in phantom lines.
Figure 2:
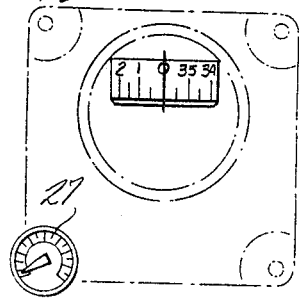
FIG. 2 is a front elevation of the directional gyro shown in FIG. 1, illustrating the position, orientation, and size relationship between the illustrative vacuum gauge and the host vacuum driven directional gyro.

Before going into detail relating to the construction of the adjustable pressure sensing device, it will be helpful to appreciate how the same can be used. Reference to FIG. 1 will indicate that the entire suction gauge configuration can be miniaturized to a seven-eights inch diameter main body, although the same can actually be reduced to five-eighths inch diameter, presenting a dial face of one inch to one and one half inches in diameter. As shown in FIG. 2, the dial or gauge indication of the adjustable pressure sensing device is integral with the silhouette of the directional gyro, and accordingly, will not interfere with any other instruments mounted in a conventional aircraft instrument panel.

Figure 3:
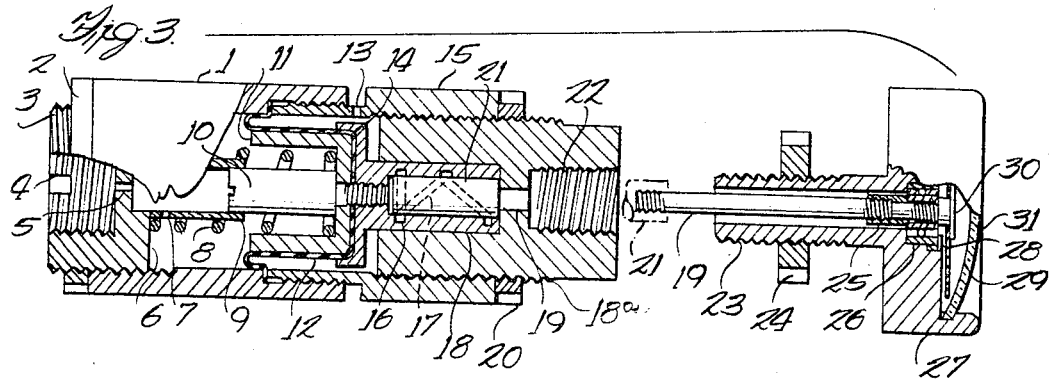
FIG. 3 is a front elevation enlarged from that shown in FIG. 1 in which a longitudinal section has been taken through the illustrative vacuum gauge, and in which the dial portion has been exploded to show with greater clarity the configuration of the related parts.

The details of construction of the suction gauge form of the adjustable pressure sensing device illustrative of the invention is shown in FIG. 3. There it will be seen that a tubular housing 1 is provided with a central cylindrical bore having a locking nut 2 which holds the adjustable end cap 3 in position. An internal outlet opening 4 is provided in the adjustable end cap 3, and leads to the vacuum outlet orifice 5 to either a vacuum line or hose fitting, or directly to the vacuum instrument as illustrated in FIG. 1. A spring seat 6 is defined at the inner end portion of the adjustable end cap 3, and supports the calibrated spring 8. A piston guide 10 in the form of a cylindrical shaft depends beneath the piston 11, and slides within the central tubular portion of the spring aligning surface 9. As will be observed, a vacuum outlet or equalizing port 7 is provided in the spring aligning cylinder 9 in order that the pressures in the vacuum chamber not be upset by the piston-like action between the piston guide 10 and its related cylindrical aligning element 9.

The piston 11, it will be observed, is hollow on its internal portion so that an annular area is defined which is taken up by the calibrated spring 8. The head of the piston as well as its side walls are completely covered by a sensitive membrane type diaphragm 12. An ambient pressure port 13 is provided to permit an equalization of the pressures on one side of the diaphragm to atmosphere so that a standard of comparison will exist on the other side, such standard of comparison being translated into longitudinal motion of the piston 11. A piston cap guide 14 having a depending peripheral skirt portion is positioned in abutting relationship over the top of the piston 11, and also serves to anchor and centrally position the sensitive membrane type diaphragm 12 atop the piston.

Figure 4:
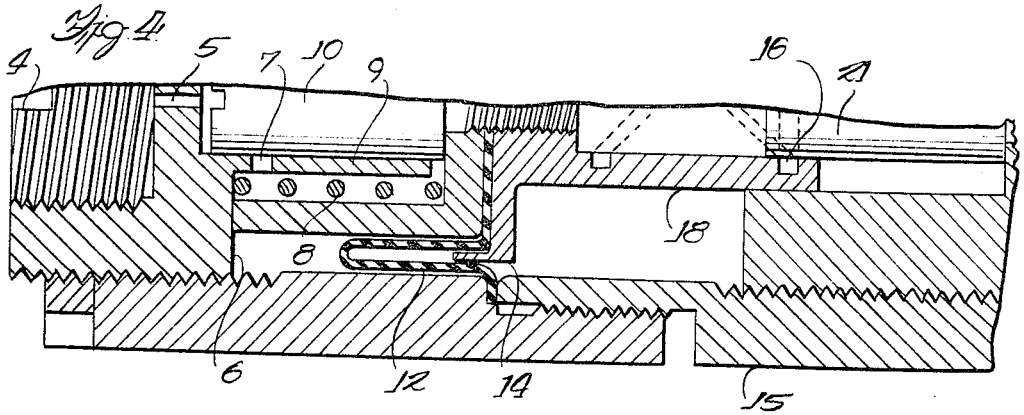
FIG. 4 is a substantially enlarged sectional view taken from the same elevation as FIG. 3, showing the relationship between the piston and the housing at the opposite position of the piston as shown in FIG. 3.

A second housing section 15 is provided with an end threaded portion threaded to engage the interior portion of the tubular housing 1. More particularly, it will be observed that at the end of the threaded portion of the housing section 15 a shoulder or abutment exists (see particularly FIG. 4) which permits the threaded adjustment of the housing section 15 in order to jammingly or squeezingly engage the peripheral edge of the sensitive membrane type diaphragm 12. Thus the housing section 15 cooperates with the piston cap drive 14 in securingly positioning the sensitive membrane diaphragm 12, and similarly permit the diaghragm to be changed readily in the event it becomes worn, torn, or otherwise not serviceable.

The longitudinal movement of the piston 11 responsive to changes in pressure in the chambers defined by the diaphragm 12 are translated into rotational motion and a reading on the gauge dial by means of the drive pin 16 which, in turn, engages the helical slot 17 cut in the interior portion of the piston cap shaft 18. The helix drive pin 16 is secured to the end shaft 21 of the instrument and actuating rod 19. Thus the longitudinal movement of the piston, by means of pressure variations, is translated into a corresponding longitudinal movement of the piston cap shaft, the helix 17 of which engages the fixed drive pin 16 and rotates the instrument hand actuating rod 19. The position relatively between the instrument hand actuating rod 19 and the piston 11 can be adjusted through the rotation of the adjustable end cap housing 18a which interiorly threadedly engages the housing section 15. An end cap locking nut 20 is provided in order to fix the position of the adjustable end cap 18a with regard to the housing section 15 in the same manner as the locking nut 2 is provided to affix the position of the adjustable end cap 3 with relation to the main tubular housing 1. In this manner, the reading of the dial can be brought to zero without adjustment of the dial by shifting the relative relationship between the drive pin 16 end limit stop and the helical slot 17.

A threaded bore 22 is provided in the adjustable end cap housing 18a to receive the adjustable bezel housing shaft 23, the end of which is threaded. A panel lock nut 24 is provided to optionally secure the bezel housing shaft 23 to the adjustable end cap housing 18a, or secure the entire unit to the panel.

A hand actuating rod bearing 26 is provided within the bezel housing 27, and receives a threaded end of the instrument hand actuating rod 19. The same shaft or bushing 25 extends to receive the bearing 26, and thereafter the dial pointer hand screw 30. The dial pointer hand 29 is thereby adjustably secured to rotate responsive to the rotation of the instrument hand actuating rod 19, but is adjustable radially to assist in the calibration of the instrument. The bezel housing 27 has an extending rim portion which receives the covering lens 31, thereby protecting the indicia 32 from contamination and other foreign bodies in use, as well as protecting the dial pointer hand 29 itself. A bearing retainer ring 28 is employed to securely keep the bearing 26 in its nested relationship with the bezel housing 27, and similarly permit the easy removal thereof for servicing.

In operation, the adjustable pressure sensing device, in this instance a suction gauge, is coupled to an air line or instrument at the internal outlet opening 4. The reduction of pressure within the chamber defined by the flexible diaphragm 12 will move the piston longitudinally against the pressure of the spring 8. The helical slot 17 in the piston cap guide 14 then bears upon the drive pin 16 and rotates the hand actuating arm 19, thereby translating the longitudinal motion of the piston into a rotary motion which is read out on the dial. The pitch of the helical slot 17 is developed according to known standards (see Marks Mechanical Engineers Handbook, sixth edition, section 2–63); while normally, the constant linear movement of the piston will be converted into constant radial movement on the dial, this relationship may be varied. For example, where sensitivity in a critical range is involved, the helix pitch at that point can be reduced and therefore give a more accurate dial reading in the critical range. Ambient pressure is admitted into the opposite side of the diaphragm 12 by means of the ambient pressure inlet 13. The sensitivity and calibration is accomplished by moving the adjustable end cap 3 inwardly or outwardly to vary the pressure on the spring while also varying the volume of the chamber. Similarly, the adjustable end cap 18a at the opposite position can be rotated inwardly and outwardly and subsequently held in position by the end cap locking nut 20. Additional adjustment, as set forth above, is also provided by the dial pointer hand screw 30. Thus in the suction gauge embodiment, it will be seen that parts have been held to an irreducible minimum, and even those parts are primarily susceptible of economical manufacture on a screw machine. The threaded interrelationship of the various parts, and particularly the combined action of two of the parts in the housing to support the flexible membrane 12, permit economical manufacture, unusual sensitivity, and easy adjustment in the field.

Figure 5:
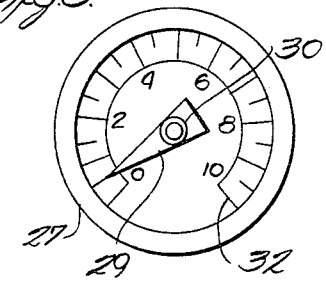
FIG. 5 is a front elevation enlarged from that shown in FIG. 2 of the dial shown in side view in FIG. 3.

A modified embodiment of the suction gauge adaptation of the invention is shown in FIGS. 6 through 9 inclusive. Similar reference numerals have been shown where the parts are substantially identical. It will be observed in this instance, however, that the piston end cap 33 is provided with a plurality of longitudinal peripheral slots into which small permanent magnets 34 have been positioned. A plurality of longitudinal holes are bored in the adjustable end cap housing 18a, and receive the electrical contactors 36. The electrical contactors are of the reed type which are actuated by their proximate relationship to a magnet flux. Each of the electrical contactors 36 is supported by means of a support spring 35, and the electrical contactors 36 are adjusted in their longitudinal relationship with the piston cap guide and its associated shaft and magnets by means of the adjustment screw 40 which contains the electrical outlet to switch 38 and its associated insulation 39. A screw slot 37 is provided in the end of the adjustable end cap 38 to adjust the relationship with the piston cap 33, and also to disassemble the unit. As will be observed, the relative positions of the electrical contactors 36 as shown in FIGURE 6 is such that contact will be made at progressive differential positions of the piston 11. Thus is is possible, as shown in FIG. 8, to have several separate positions which will be electrically actuated at various positions of the piston 11. The piston 11 is shown in its lowermost position in FIG. 7, which is similar to the relationship shown in FIG. 4. The advantage of the vacuum gauge application of this unit becomes readily apparent when it is appreciated that either direct reading or remote reading or a combination of both can be provided. For example, the cap shaft 18 (see FIG. 3) is provided with the magnets 34 and switches 36 (see FIG. 6) and then the vacuum gauge of FIG. 3 is provided with a direct reading dial (see FIG. 5) and also the electrically actuated readings of the FIGS. 6–9 embodiments. By using the electrical contactors 36, it is possible that relays can be actuated in an aircraft, for example, to ring a warning horn when the vacuum in the instrument system falls below a safe level. Conversely, when it exceeds a safe level, the warning horn can also be actuated. The compactness of the electrically actuated suction gauge embodiment of the invention is best illustrated in FIG. 9 where it may be appreciated that the total outer diameter is approximately an inch, and the length of the unit is not much more than three inches.

The pressure gauge adaptation of the subject invention is illustrated in FIGS. 10 and 11, where it will be observed that the basic housing configuration is substantially the same as the two suction gauge adaptations already shown and described in detail. There it will be noted that the piston end cap 42 has a similar depending skirt relationship to the piston and the flexible membrane 12 as set forth heretofore. Similarly, the flexible membrane 12 is secured to the side walls of the chamber to divide the same into an active chamber and an ambient chamber in much the same manner as set forth before, the ambient chamber outlet 13 being similarly located. In this instance, however, the housing section 15 is employed to guide the spring 8 in its abutting relationship with the underneath side of the piston, as by the piston guide portion 44. The helical slot 45 is cut on the inside portion of the piston guide 44 and engages a drive pin 46 which is secured to the instrument hand actuating rod 47. In this instance, the instrument hand actuating rod 47 proceeds to the dial in the same manner as described regarding the suction gauge above. In this instance, the pressure inlet 4 may be adjusted inwardly or outwardly to reduce or increase the size of the operating chamber, and in this manner, also adjust the diaphragm position. Adjustment on the spring is achieved by rotating the spring base insert 15a. The read-out is accomplished on the dial as shown in FIG. 11, and is calibrated in accordance with means understood to skilled instrument workers.

A further embodiment of the invention is shown in FIG. 12 where the structure is modified in order to provide a vacuum regulator. There it will be seen that an adjustable outlet 49 is provided which threadedly engages the main cylinder defining housing, and has a central orifice terminating in a frustoconical venturi section 50 which is the outlet for the unit, and which further serves to matingly relate with the fluted end 51 on the valve stem 52. Air is admitted from the instruments through the orifice provided in a lateral portion of the main body 53, which is threaded at its outer portion to permit attachment with conventional hosing. It will be observed that the piston 11 and its associated flexible membrane 12 are mounted in the same fashion as the other two embodiments; however, the end cap and piston guide 54 is modified slightly in its construction. The main shaft of the end cap and piston guide 54 is received within the end housing 56 which, at its central portion, bears a threaded relationship with the adjustable end cap 55 for the piston guide 54.

In operation, when taking off from airports at sea level or close to sea level elevations, the action of the vacuum pump is unusually strong, sometimes running to the area of thirty to thirty-two inches of mercury. Under these circumstances, the pressure differential between the atmosphere or ambient inlet 13 and the area beneath the piston is such as to pull the piston and its flexible membrane downwardly to a point where the fluted ends 51 on the valve stem seat in the frustoconical venturi section 50. The flutes are adjustably proportioned to provide a maximum pressure differential at this point to a level which is safe for the instrument system somewhere between four and five inches of mercury being an ideal setting for presently available aircraft instruments. As the aircraft goes upwardly, and the cruising r.p.m. are reduced, as well as the ambient outside air pressure, the action of the spring 8 takes over and the piston moves outwardly permitting additional air to be delivered from the instruments to the pump, thereby regulating the flow and regulating the amount of vacuum impressed upon the instruments. As will be observed, it is possible, where narrower limits are desired, to turn the adjustment screw 55 in order to limit the distance of travel which can be made by the piston 11 and its associated flexible membrane 12. Another adjustment, of course, can be made by rotating the other end cap 49 which contains the valve seat 50 to reduce the pressure on the piston 11 maintained by the spring 8. Thus a twofold adjustment can be made very readily with simple tools of the vacuum regulator embodiment of the invention.

In review, it will be seen that four separate embodiments of the invention relating to an adjustable pressure sensing device have been disclosed. The first embodiment shows a suction gauge which is readily adaptable to present aircraft instruments, but vastly simplified over present commercially employed devices. The second embodiment is a modification of the vacuum gauge which permits a digital type read-out to electrical contacts for either direct lighting various sequential stages of suction or for activating various other auxiliary pieces of equipment. The third embodiment is a pressure gauge adaptation of the invention, and the fourth embodiment shows the subject invention with its structure employed as a vacuum regulator. It will be appreciated, of course, that certain combinations of the various embodiments can be made all within the scope of the invention, and all for the purpose of providing pressure sensing devices which are inherently easy to manufacture, and which can be built with an irreducible minimum of tool settings on automatic screw machines and similar manufacturing devices.

Although particular embodiments of the invention have been shown and described in full here, there is no intention to thereby limit the invention to the details of such embodiments. On the contrary, the intention is to cover all embodiments, alternative embodiments, usages and equivalents of the invention as fall within the spirit and scope of this invention, specification and appended claims.

I claim:
1. An adjustable pressure sensing device comprising in combination, a cylindrical tubular housing a cylindrical piston receiving portion, cylindrical sleeve engaging the cylindrical tubular housing, an annular shoulder depending from the cylindrical piston receiving portion of the housing proportioned to abut the end of the cylindrical sleeve, a piston constrained for reciprocating movement within the housing, a piston cap, a diaphragm member secured at its central portion to the piston head by the piston cap and secured to the housing at its edges by the pinching action between the sleeve and annular shoulder, shaft means extending longitudinally from the piston, a rotatable actuating rod, helical means coupling the shaft means to the actuating rod whereby the piston reciprocating longitudinal motion responsive to pressure differentials on opposite sides of the diaphragm is translated into rotary motion, and longitudinally adjustable end caps on each end of the device acting on opposite ends of the helical means whereby the rotatable actuating rod and any associated read out means may be calibrated from either end of the device.

2. In the pressure sensing device of claim 1, a pointer and dial read out at an end of the actuating rod.

3. In the pressure sensing device of claim 2, adjustment means on the pointed coupling the same to the actuating rod whereby three separate calibrations can be made each independent of the other.

4. In the pressure sensing device of claim 1, a helically grooved central bore interior of the shaft means extending longitudinally from the piston, and a pin on the actuating rod proportioned to engage the helical groove whereby movement of the piston rotates the rod.

5. In the pressure sensing device of claim 4, vacuum gauge adapting means comprising piston sliding guide means between the piston and the adjustable end cap and remote from the helically grooved central bore, and yieldable means normally urging the piston toward the helically grooved central bore.

6. In the pressure sensing device of claim 4, pressure gauge adapting means comprising yieldable means coextensive with the extending shaft means biasing the piston normally away from the actuating rod pin.

References Cited by the Examiner

UNITED STATES PATENTS

| | | | |
|---|---|---|---|
| 2,719,431 | 10/1955 | Grant | 73—419 |
| 2,948,151 | 8/1960 | Astl | 73—406 |
| 3,028,758 | 4/1962 | Passaggio | 73—419 |
| 3,034,535 | 5/1962 | McGay et al. | 73—407 X |
| 3,066,527 | 12/1962 | Stein | 73—406 |
| 3,085,780 | 4/1963 | Yale | 251—61 |
| 3,121,552 | 2/1964 | Wilson | 251—61 |

FOREIGN PATENTS

| | | |
|---|---|---|
| 215,477 | 5/1924 | Great Britain. |
| 553,211 | 5/1943 | Great Britain. |

LOUIS R. PRINCE, *Primary Examiner.*

D. O. WOODIEL, *Assistant Examiner.*